United States Patent
Park

(10) Patent No.: US 6,392,552 B1
(45) Date of Patent: May 21, 2002

(54) WEAK COOLING/OVERCOOLING COMPENSATION DEVICE FOR REFRIGERATOR

(75) Inventor: Joon Bae Park, Changwon (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/468,608

(22) Filed: Dec. 21, 1999

(30) Foreign Application Priority Data

Dec. 31, 1998 (KR) ............................................. 98/63604

(51) Int. Cl.[7] ............................................... G08B 21/00
(52) U.S. Cl. ...................... 340/635; 340/501; 340/510; 62/208; 62/209
(58) Field of Search ................................ 340/635, 539, 340/286.09, 527, 511, 510, 501, 585, 588, 589; 318/139; 62/208, 190, 209, 227

(56) References Cited

U.S. PATENT DOCUMENTS

| | | | |
|---|---|---|---|
| 4,395,887 A | * 8/1983 | Sweetman | 62/155 |
| 5,025,248 A | * 6/1991 | Bergeron | 340/596 |
| 5,335,514 A | * 8/1994 | Hennessee et al. | 62/227 |
| 5,355,467 A | * 10/1994 | MacWilliams et al. | 395/425 |
| 5,939,974 A | * 8/1999 | Heagle et al. | 340/286.09 |
| 5,959,529 A | * 9/1999 | Kail, IV | 340/539 |

* cited by examiner

Primary Examiner—Jeffery Hofsass
Assistant Examiner—Davetta W. Goins
(74) Attorney, Agent, or Firm—Birch, Stewart, Kolasch & Birch, LLP

(57) ABSTRACT

The device for compensating a weak cooling/overcooling for a cooling chamber of a refrigerator has a plurality of resistances connected in series between the power and ground and a plurality of switches connected in parallel to the plurality of resistances. A microprocessor receives a voltage divided according to an open/close state of the plurality of switches through a single input terminal. The device performs a weak cooling/overcooling compensation operation.

2 Claims, 5 Drawing Sheets

FIG. 2
CONVENTIONAL ART

| WEAK COOLING COMPENSATION | | STRONG COOLING COMPENSATION | | TEMPERATURE COMPENSATION VALUE IN COOLING CHAMBER | EACH DIN INPUT VOLTAGE (V) |
|---|---|---|---|---|---|
| OP1 | OP2 | OP3 | OP4 | | OP 1/2/3/4 |
| ○─○ | ○─○ | ○─○ | ○─○ | 0 °C | 0 (WHEN SHIPPED FROM FACTORY) |
| CUT | ○─○ | ○─○ | CUT | 0 °C | 5/0/0/5 |
| ○─○ | CUT | ○─○ | CUT | 0 °C | 0/5/0/5 |
| CUT | CUT | CUT | CUT | 0 °C | 5/5/5/5 |
| CUT | ○─○ | CUT | ○─○ | 0 °C | 5/0/5/0 |
| ○─○ | CUT | CUT | ○─○ | 0 °C | 0/5/5/0 |
| CUT | ○─○ | ○─○ | ○─○ | −1 °C | 5/0/0/0 |
| ○─○ | CUT | ○─○ | ○─○ | −1 °C | 0/5/0/0 |
| CUT | CUT | CUT | ○─○ | −1 °C | 5/5/5/0 |
| CUT | CUT | ○─○ | CUT | −1 °C | 5/5/0/5 |
| CUT | CUT | ○─○ | ○─○ | −2 °C | 5/5/0/0 |
| ○─○ | ○─○ | CUT | ○─○ | +1 °C | 0/0/5/0 |
| ○─○ | ○─○ | ○─○ | CUT | +1 °C | 0/0/0/5 |
| CUT | ○─○ | CUT | CUT | +1 °C | 5/0/5/5 |
| ○─○ | CUT | CUT | CUT | +1 °C | 0/5/5/5 |
| ○─○ | ○─○ | CUT | CUT | +2 °C | 0/0/5/5 |

FIG. 5

| WEAK COOLING COMPENSATION | | STRONG COOLING COMPENSATION | | TEMPERATURE COMPENSATION VALUE IN COOLING CHAMBER | A/D INPUT VOLTAGE (V) |
|---|---|---|---|---|---|
| OP1 | OP2 | OP3 | OP4 | | |
| ○─○ | ○─○ | ○─○ | ○─○ | 0 °C | 2.5 (WHEN SHIPPED FROM FACTORY) |
| CUT | ○─○ | ○─○ | CUT | 0 °C | 2.5 |
| ○─○ | CUT | ○─○ | CUT | 0 °C | 2.5 |
| CUT | CUT | CUT | CUT | 0 °C | 2.5 |
| CUT | ○─○ | CUT | ○─○ | 0 °C | 2.5 |
| ○─○ | CUT | CUT | ○─○ | 0 °C | 2.5 |
| CUT | ○─○ | ○─○ | ○─○ | −1 °C | 1.67 |
| ○─○ | CUT | ○─○ | ○─○ | −1 °C | 1.67 |
| CUT | CUT | CUT | ○─○ | −1 °C | 2.0 |
| CUT | CUT | ○─○ | CUT | −1 °C | 2.0 |
| CUT | CUT | ○─○ | ○─○ | −2 °C | 1.25 |
| ○─○ | ○─○ | CUT | ○─○ | +1 °C | 3.3 |
| ○─○ | ○─○ | ○─○ | CUT | +1 °C | 3.3 |
| CUT | ○─○ | CUT | CUT | +1 °C | 3.0 |
| ○─○ | CUT | CUT | CUT | +1 °C | 3.0 |
| ○─○ | ○─○ | CUT | CUT | +2 °C | 3.7 |

WEAK COOLING/OVERCOOLING COMPENSATION DEVICE FOR REFRIGERATOR

BACKGROUND OF THE INVENTION

1. Field of the Invention

The present invention relates to a device for compensating a weak cooling or overcooling for a cooling chamber of a refrigerator, and in particular to an improved device for compensating a weak cooling or overcooling for a cooling chamber of a refrigerator which can compensate a weak cooling/overcooling by using a single input terminal of a microprocessor in order to simplify a circuit and decrease a cost when compensating the weak cooling/overcooling by connecting a plurality of switches to a plurality of input terminals of the microprocessor.

2. Description of the Background Art

A conventional weak cooling/overcooling compensation device for a cooling chamber will now be explained with reference to the accompanying drawings. FIG. 1 illustrates a structure of the conventional weak cooling/overcooling compensation device for the cooling chamber. As shown therein, four input terminals of a microprocessor performing the weak cooling/overcooling compensation according to variation of an input signal are respectively connected to four option pins, and the four option pins are respectively connected to four resistances. The option pin is a kind of switch which can be easily cut, and thus performs an open operation of the switch. The operation of the conventional weak cooling/overcooling compensation device for the cooling chamber will now be described with reference to FIG. 2.

FIG. 2 is a temperature compensation table of the conventional weak cooling/overcooling compensation device for the cooling chamber. In case the weak cooling/overcooling takes place in the cooling chamber (not shown), as shown in the temperature compensation table of FIG. 2, the weak cooling/overcooling is compensated by cutting the necessary option pin. As depicted in FIG. 1, a voltage is not applied to the input terminal connected to the option pin which is not cut, and a voltage of 5V is applied to the input terminal connected to the option pin which is cut. The microprocessor senses an input variation resulting from cutting of the option pins, and performs the weak cooling/overcooling temperature compensation. For example, in the case that the weak cooling takes place in the cooling chamber and thus a temperature of the cooling chamber needs to be compensated by −1° C., as shown in the temperature compensation table of FIG. 2, the first option pin OP1 is cut, and the other option pins OP2~OP4 are not cut (option pins are all connected when shipped from the factory). Accordingly, the input values inputted to first to fourth input terminals of the microprocessor are varied to 5V, 0V, 0V and 0V, respectively. The microprocessor receiving the input values compensates for the temperature by −1° C. In the same manner, as shown in the temperature compensation table of FIG. 2, when only the second option pin is cut, the input values inputted to the first to fourth input terminals of the microprocessor are varied respectively to 0V, 5V, 0V and 0V. Thus, the microprocessor compensates for the temperature by −1° C.

When the overcooling takes place in the cooling chamber, the resultant temperature compensation will now be explained. In order to increase the temperature of true cooling chamber when the overcooling is generated therein (for instance, in case a temperature must be increased by +2° C.), as shown in the temperature compensation table of FIG. 2, the third and fourth option pins are cut, and the first and second option pins are not cut. In this case, the input values inputted to the first to fourth input terminals of the microprocessor are varied to 0V, 0V, 5V and 5V, respectively. Accordingly, the microprocessor compensates for the temperature by +2° C. However, when the temperature compensation is performed, the number of the temperatures to be compensated may be increased. In addition, a spare option pin may be necessary, which results in the increased number of the option pins.

In the conventional art, as the number of the option pins to be cut in order to compensate the weak cooling/overcooling is increased, the number of the input terminals of the microprocessor is also increased. As a result, a substrate size and a fabrication cost are increased.

SUMMARY OF THE INVENTION

It is therefore an object of the present invention to provide a weak cooling/overcooling compensation device for a cooling chamber which can decrease a substrate size and a fabrication cost by reducing input terminals of a microprocessor into one.

In order to achieve the above-described object of the present invention, there is provided a weak cooling/overcooling compensation device for a cooling chamber, including: a plurality of resistances connected in series between the power and ground; a plurality of switches connected in parallel to the plurality of resistances; and a microprocessor receiving a voltage divided according to an open/close state of the plurality of switches through a single input terminal, and performing a weak cooling/overcooling compensation operation.

BRIEF DESCRIPTION OF THE DRAWINGS

The present invention will become better understood with reference to the accompanying drawings which are given only by way of illustration and thus are not limitative of the present invention, wherein:

FIG. 2 is a temperature compensation table of the conventional weak cooling/overcooling compensation device for the cooling chamber;

FIG. 5 is a temperature compensation table of the weak cooling/overcooling compensation device for the cooling chamber in accordance with the present invention.

DETAILED DESCRIPTION OF THE PREFERRED EMBODIMENTS

The structure and operation of a weak cooling/overcooling compensation device for a cooling chamber in accordance with the present invention will now be described in detail with reference to FIGS. 3 to 5.

Figure 1:
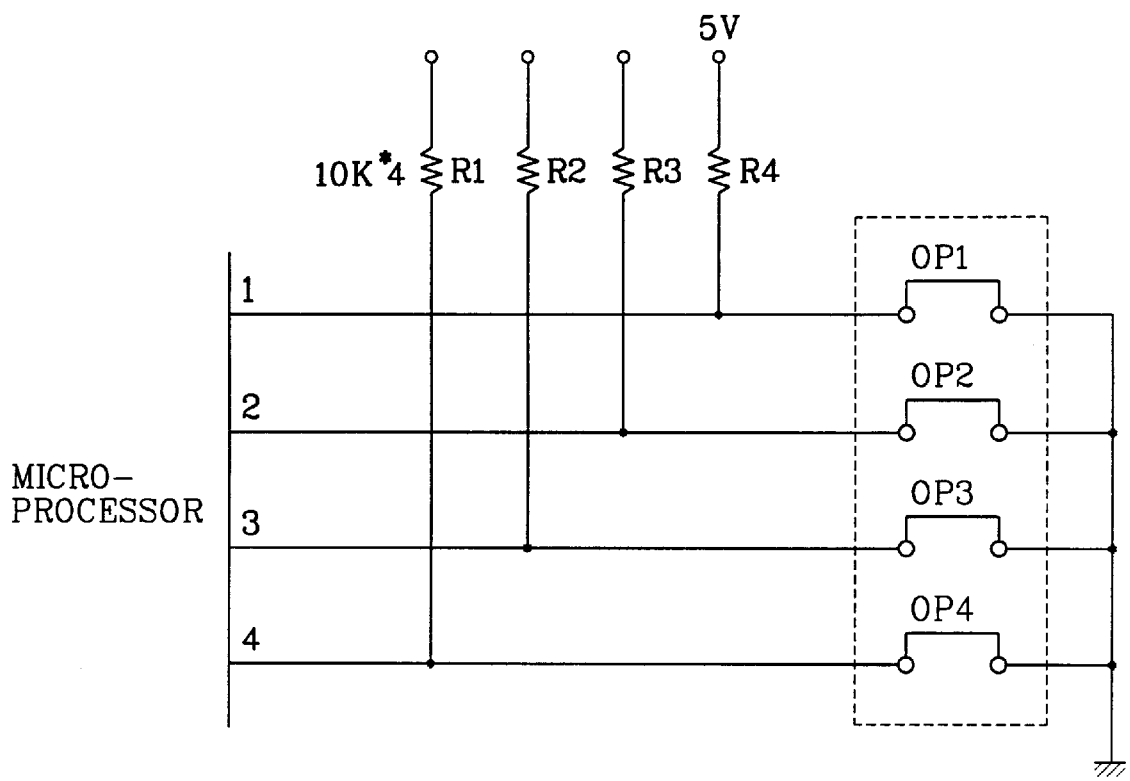
FIG. 1 illustrates a structure of a conventional weak cooling/overcooling compensation device for a cooling chamber.
Figure 3:
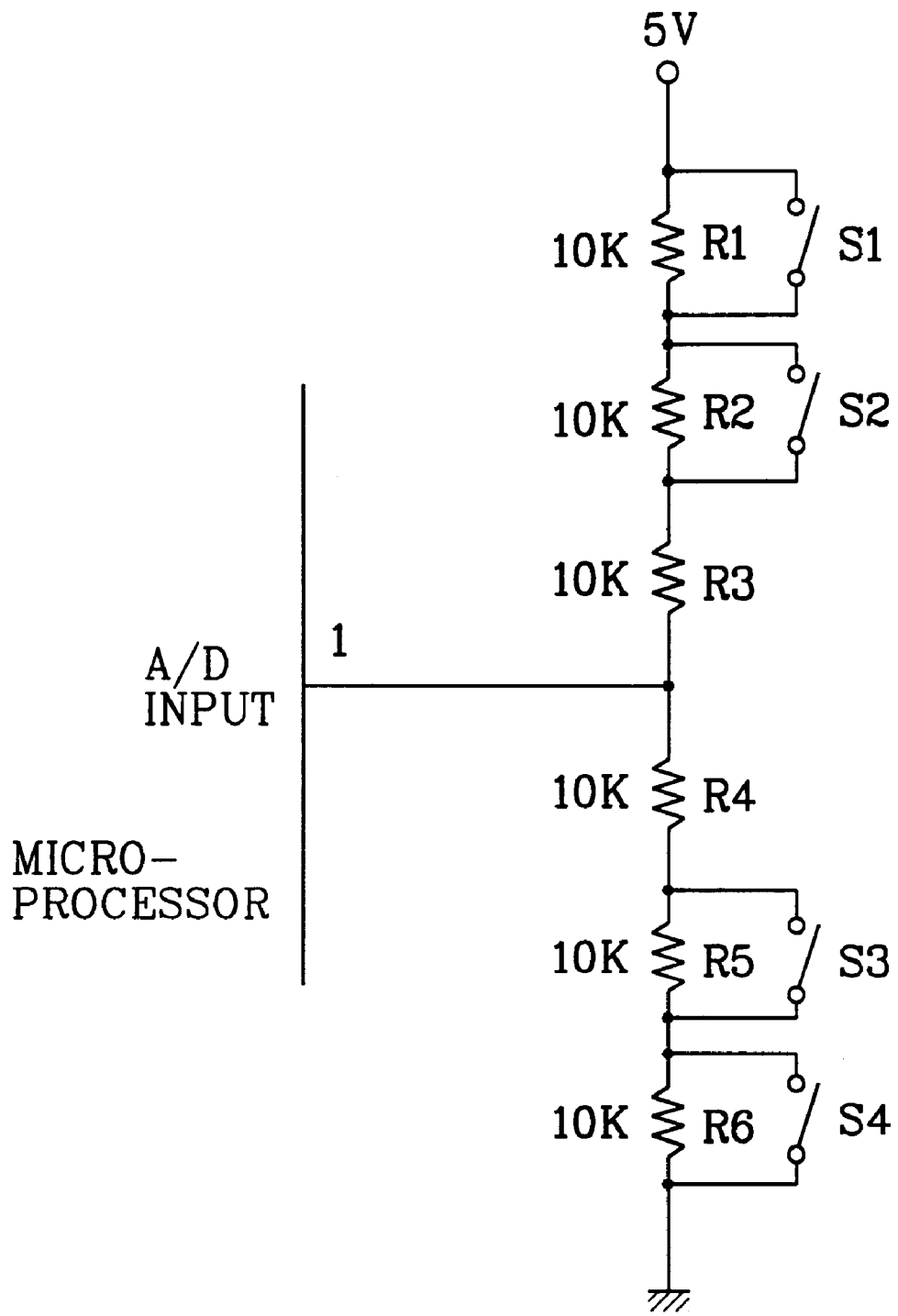
FIG. 3 illustrates a structure of a weak cooling/overcooling compensation device for a cooling chamber in accordance with a first embodiment of the present invention.
Figure 4:
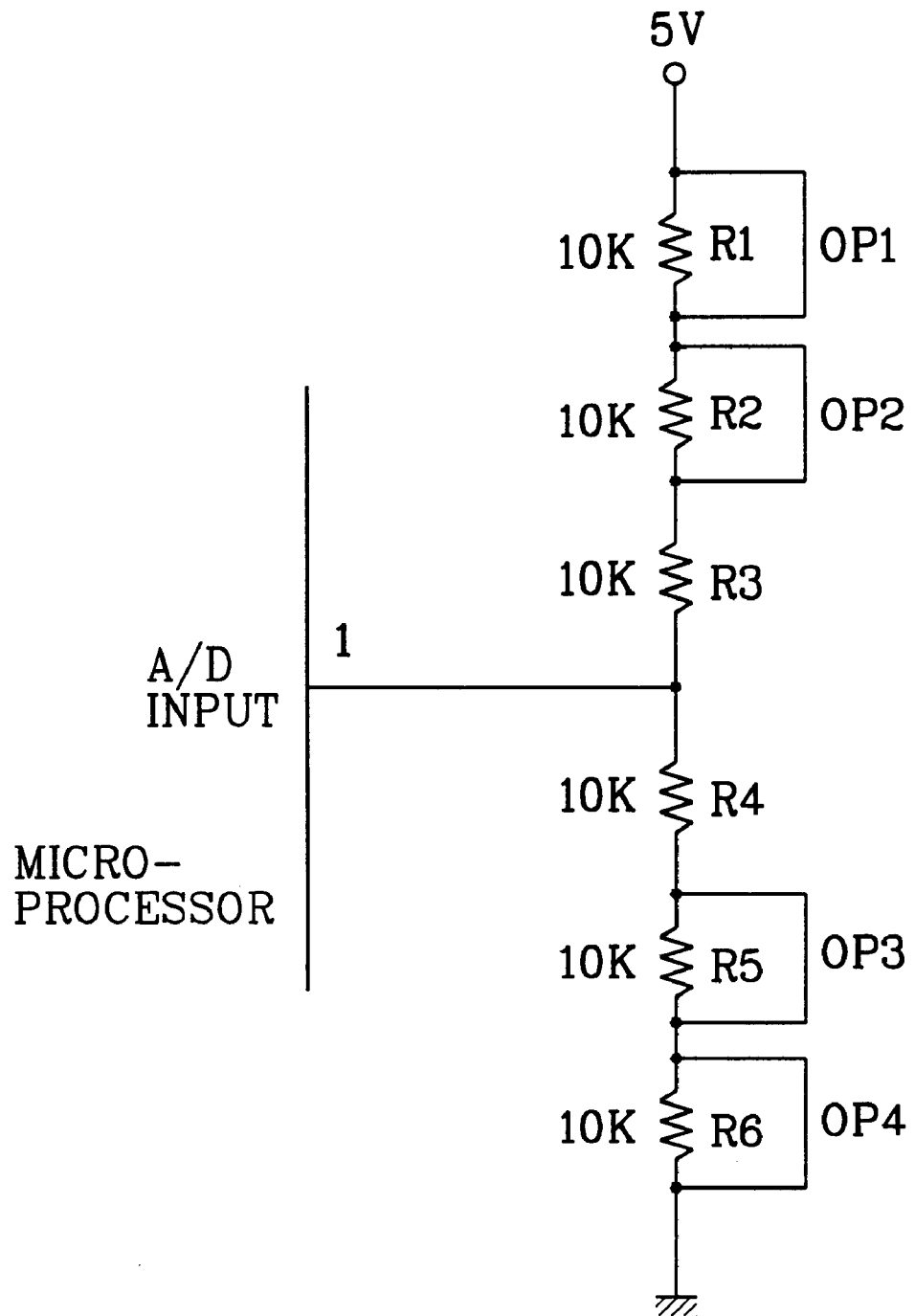
FIG. 4 illustrates a structure of a weak cooling/overcooling compensation device for a cooling chamber in accordance with a second embodiment of the present invention.

FIG. 3 illustrates the structure of the weak cooling/overcooling compensation device for the cooling chamber in accordance with a first embodiment of the present invention.

As shown therein, the weak cooling/overcooling compensation device for the cooling chamber includes: a plurality of resistances R1~R6 connected in series between the power and ground; a plurality of switches S1~S4 connected in parallel to the plurality of resistances R1, R2, R5 and R6; and a microprocessor receiving a voltage divided according to an open/close state of the plurality of switches S1~S4 through a single input terminal, sensing the inputted voltage by analog/digital conversion, and performing a weak cooling/overcooling compensation operation. As illustrated in FIG. 3, a voltage value between the single input terminal of the microprocessor and the ground is varied according to the open/close state of the plurality of switches S1~S4 connected to the plurality of resistances R1~R6. For example, when the first switch S1 and the second switch S2 are open (in a state where the other switches are still connected), the voltage between the ground and the single input terminal becomes 5V×¼, namely 1.2V In the same manner, in case only the third switch S3 is open (in a state where the other switches are connected), the voltage between the ground and the single input terminal becomes 5V×⅔, namely 3.33V. As described above, the voltage between the single input terminal of the microprocessor and the ground is varied according to the open/close state of each switch. The microprocessor senses the voltage inputted to the single input terminal by using the analog/digital conversion function, and thus performs the weak cooling/ overcooling temperature compensation operation. FIG. 5 is a temperature compensation table of the weak cooling/ overcooling compensation device for the cooling chamber in accordance with the present invention. The table shows the voltage values inputted to the single input terminal of the microprocessor according to the open/close state of the respective switches, and the resultant temperature compensation values in the cooling chamber.

The power voltage divided at a different ratio according to the open/close state of the switches is inputted to the single input terminal of the microprocessor, thereby performing the compensation operation. Accordingly, the number of the resistances and switches as shown in FIG. 3 is set in order to perform the temperature compensation operation. In addition, in accordance with the first embodiment of the present invention, a center point of the even number of serially-connected resistances as shown in FIG. 3 is connected to the input terminal of the microprocessor. However, even though a predetermined contact point of the serially-connected resistances is connected to the single input terminal of the microprocessor, the voltage division may be performed, engaged with the number of the resistances and switches and the open/close state of the switches. However, as depicted in FIG. 3, when the center point of the even number of serially-connected resistances is connected to the single input terminal of the microprocessor, and when the identical number of switches are positioned at both sides centering around the center point, the resultant advantages will now be explained with reference to FIG. 4. FIG. 4 shows a state where the option pins which can be easily cut are used as switching units. When the option pin is cut, the open operation of the switch is performed. As illustrated in FIG. 4, in order to compensate the temperature by −1° C. when the two option pins and the three resistances are positioned at both sides centering around the center point, as shown in the temperature compensation table of FIG. 5, in the simplest way, the first option pin OP1 or the second option pin OP2 positioned at one side is cut (option pins are all connected when shipped from the factory). Accordingly, the temperature compensation can be easily performed without referring to the table as shown in FIG. 5 in every case. In the same manner, as shown in FIG. 5, the simplest method for compensating the temperature by +2° C. is to cut the first option pin OP1 and the second option pin OP2 positioned at one side centering around the center pin (option pins are all connected when shipped from the factory), and the simplest method for compensating the temperature by −2° C. is to cut the third option pin OP3 and the fourth option pin OP4 positioned at the other side centering around the center pin (option pins are all connected when shipped from the factory). As described above, when the center point of the even number of serially-connected resistances is connected to the single input terminal of the microprocessor, and when the identical number of option pins are positioned at both sides centering around the center point, the weak cooling compensation and the overcooling compensation are symmetrically performed. As a result, the temperature compensation can be conveniently carried out.

As discussed earlier, the weak cooling/overcooling compensation device for the cooling chamber in accordance with the present invention carries out the weak cooling/ overcooling compensation operation by employing one input terminal among the input terminals of the microprocessor, thereby simplifying the circuit and reducing the cost. When the single input terminal is connected to the center point of the serially-connected resistances, the compensation operation can be conveniently performed.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A device for compensating weak cooling/overcooling of a refrigerator, the device comprising:

a controlling temperature compensation device having a plurality of resistors connected in series between a power source and ground and a plurality of switching units connected in parallel to the plurality of resistors, respectively, for outputting a selectively divided voltage; and a microprocessor having an analog/digital conversion unit for converting said divided voltage value to a digital value, said divided voltage being input into a single input terminal of the microprocessor.

2. The device according to claim 1, wherein the switching units comprise option pins which can be cut.

* * * * *